Figure 2:
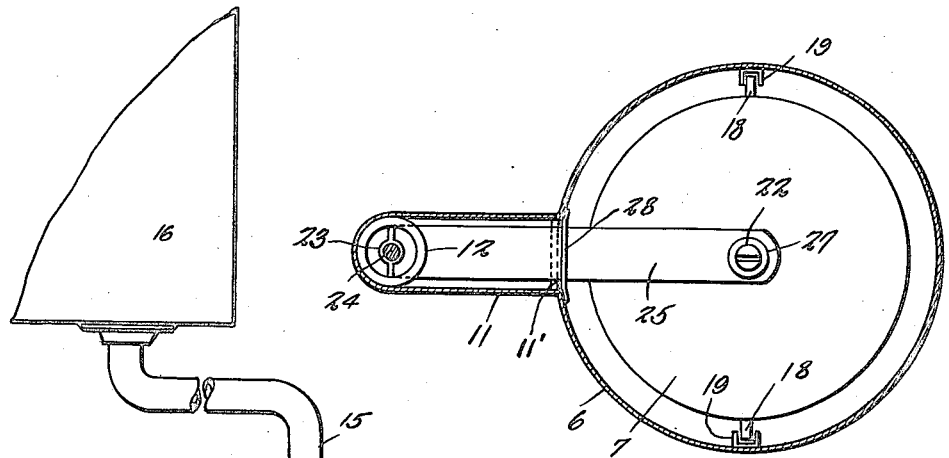

F. J. C. NICHALSON.
AUTOMATIC OILING DEVICE FOR INTERNAL COMBUSTION ENGINES.
APPLICATION FILED APR. 8, 1921.

1,415,464.

Patented May 9, 1922.

Inventor

Frank J. C. Nichalson
By E. Hatton Brewington.

Attorney

UNITED STATES PATENT OFFICE.

FRANK J. C. NICHALSON, OF BALTIMORE, MARYLAND.

AUTOMATIC OILING DEVICE FOR INTERNAL-COMBUSTION ENGINES.

1,415,464.

Specification of Letters Patent.   Patented May 9, 1922.

Application filed April 8, 1921. Serial No. 459,518.

*To all whom it may concern:*

Be it known that I, FRANK J. C. NICHALSON, a citizen of the United States, residing at Baltimore city, State of Maryland, have invented certain new and useful Improvements in Automatic Oiling Devices for Internal-Combustion Engines, of which the following is a specification.

The present invention has for its object to provide a simple and efficient means for automatically maintaining a constant level of oil in the crank case of internal-combustion engines employed for the propulsion of motor vehicles, whereby the proper lubrication of the crank shaft bearings and other parts of the motor is assured.

The object stated is attained by means of a combination and arrangement of parts to be hereinafter described and claimed, and in order that the same may be better understood, reference is had to the accompanying drawings forming a part of this specification.

Figure 1:
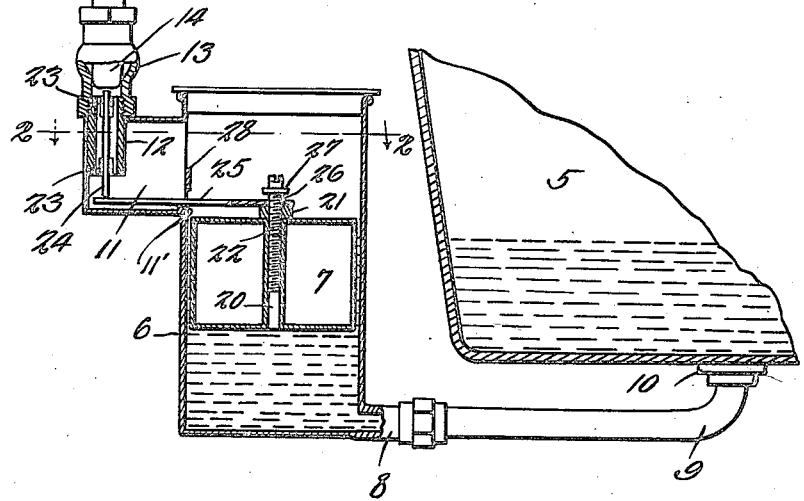

In the drawing,

Figure 1 is a sectional view showing the application of the invention, and Fig. 2 is a horizontal section on the line 2—2 of Fig. 1.

Referring specifically to the drawing, 5 denotes the crank case of an automobile engine in which it is desired to maintain a constant level of oil so that the crank shaft bearings, connecting rods, and other parts of the motor may be properly lubricated.

Alongside the crank case 5, on the outside thereof, is positioned an upright cylindrical vessel 6 containing a float 7, and having an oil inlet, as well as an oil outlet, the latter being connected to the crank case to discharge thereinto. The outlet may be an ordinary nipple 8 connected to the vessel at the bottom thereof, and also having a suitable connection 9 with an oil inlet 10 to the crank case at the bottom of the latter. The oil-inlet to the vessel 5 is by the way of the side chamber 11 formed at the top thereof and opening into the vessel. To this chamber is fitted an inlet nipple 12 to which is connected the casing 13 of an upwardly opening valve 14, and from said valve casing, a pipe line 15 leads to an oil-reservoir 16 which is elevated to obtain a gravity flow into the vessel 6. The height of the vessel 6 is such that an oil level may be obtained therein according to the height it is desired to maintain the oil level in the crank case 5.

The vessel 6 serves as a float chamber, and the float mounted therein is a hollow sheet metal body. It will be understood of course, that any other suitable float structure may be employed. The float is cylindrical, and it has at diametrically opposite points outstanding guide flanges or wings 18 which seat in guide channels 19 on the inside of the vessel. The guide wings also prevent rotation of the float. The float also has an axial opening 20 provided at its upper end with a nut 21 to receive a screw-threaded stem 22.

The chamber 11 forms a side recess in the float chamber 6, and the nipple 12 extends thereinto.

In the nipple 12 are guides 23 for a vertically slidable valve actuating rod 24 which has its lower end depending into the recess 11 so as to seat on one end of a lever 25, the other end of said lever being operatively connected to the float stem 22. The upper end of the rod passes into the valve casing 13 and terminates close to the under side of the valve 14 when the latter is seated. It will therefore be seen that the valve is pushed upwardly and unseated when the rod 24 is slid upwardly.

That end of the lever 25 which is connected to the float stem 22 has an aperture 26 through which said stem loosely passes, and on the latter is an abutment 27 which is adapted to bear down on the lever. The lever 25 rests upon a transverse ledge 11' internally carried by said recess 11, on its bottom, whereby said lever is elevated above the bottom of said recess to permit of tilting movement, and whereby the lever fulcrums on said ledge.

In operation, assuming the oil in the crank case 5 and in the float chamber 6 to be at the proper level, the float 7 is now at such a height in the float chamber that the abutment 27 is clear of the lever 25, and hence the latter has allowed the rod 24 to drop down clear of the valve 14 so that said valve is now closed and there is no flow of oil into the float chamber from the reservoir 16. If now the oil level in the crank case drops there is a corresponding drop in the float chamber, and consequently the float 7 descends, and when the abutment 27 engages the lever 25 the latter is tilted in a direction to push the rod 24 upwardly to unseat the valve 14, whereupon oil starts to flow into the float chamber from the reservoir. As the proper oil level is again reached, and there has been a corresponding rise of the float, the abutment 27 no longer bears down on the lever 25, and the valve is now permitted to close by its own weight, this movement of the valve pushing the rod 24 downwardly and tilting the lever back to its normal position. The stem 22 is adjustable in the direction of its length in order that the desired level to be maintained in the chamber 6 and the crank case 5 may be varied. The adjustment will be such that the abutment 27 barely touches the lever 25 when the oil is at the desired level, and hence a slight variation in the oil level will suffice to operate the valve to restore the proper level.

In the recess 11 is a cross-bar 28 which is located above the lever 25, and serves to prevent displacement thereof from jars. That portion of the lever 25 which extends into the recess 11 seats loosely on the bottom wall thereof when the valve 14 is closed and the forward edge of the recess bottom serves as the fulcrum of the lever on which it tilts.

The apparatus is very simple in structure, and highly efficient in operation, and it effectually serves the purpose for which it has been designed. The construction and arrangement is also such that installation of the apparatus is readily effected.

I claim:

The combination of a float chamber having, at its lower end, an outlet adapted to be connected to the crank-case of an engine, and a side recess toward the top, said recess having internally, on its bottom, a transverse ledge, a nipple connected to said recess and opening thereinto, a valve-casing connected to the nipple and containing an upward-opening valve, an oil-supply connection to the valve-casing, a push-rod slidably mounted in the nipple and extending into the valve casing to engage the valve and unseat the same, a lever projecting into said recess and resting upon said ledge as a fulcrum and being elevated thereby above the bottom of said recess, said lever engaging the push-rod for actuating the same, a float in the chamber, and a stem carried by the float and provided with an abutment above the lever to engage the same, said lever having an aperture through which the float-stem passes, said stem being longitudinally threaded and screwed into said float, whereby said stem is longitudinally adjustable to vary the spacing between the lever and the abutment.

In testimony whereof I affix my signature.

FRANK J. C. NICHALSON.